Patented July 16, 1935

2,008,028

UNITED STATES PATENT OFFICE 2,008,028

METHOD OF FORMING HARD RUBBER COATINGS

Willett J. McCortney, Royal Oak, and Edgar L. Bailey, Birmingham, Mich., assignors to Chrysler Corporation, Detroit, Mich., a corporation of Delaware No Drawing. Application June 6, 1932, Serial No. 615,764

4 Claims. (Cl. 91—70)

This invention relates to an improved method of forming hard rubber coatings on metal surfaces.

One of the main objects of the invention is to provide a method of this character by which the hard rubber coatings are integrally bonded to the metal surfaces.

Another object of the invention is to provide a method for forming on metal surfaces hard rubber coatings which are substantially homogeneous throughout and free from pit holes.

Another object of the invention is to provide a method of this character by which the coatings may be built up to a desired uniform thickness and by which sagging and running of the coating composition during its application is prevented.

Further objects of the invention are to provide a method of this kind during which are applied successive film-like layers of a coating composition having the ingredients of hard rubber in unvulcanized state and in a volatile vehicle; to provide a heat treatment for removing the vehicle from each of the layers as the latter are being applied; to provide a treatment of this kind which is conducted at a temperature materially below the vulcanizing temperature of the rubber; and to provide an internal heat treatment for this purpose during which the vehicle is removed from that portion of each layer adjacent the metal surface before the viscosity of the outermost portions of the layer becomes too great to permit flowing of the composition and closing of the passages formed therethrough by the escapement of the volatilized vehicle from the inner portions of the layer.

Still further objects of the invention are to provide a partial curing heat treatment between applications of successive layers of the coating composition for removing substantially all of the vehicle from one layer and for conditioning the latter to withstand being dissolved and penetrated by the vehicle of the next layer; to provide a pre-curing treatment of this kind which brings each layer of the coating to a sufficiently set condition to avoid running and sagging of the entire coating and which leaves each layer in condition to unite integrally with the next successive layer; and to provide a final heat curing treatment for simultaneously vulcanizing the partially vulcanized layers of the coating composition together and to a hard rubber state while in contact with the metal surface.

In coating metal surfaces in accordance with our improved method a composition having unvulcanized ingredients of hard rubber in a volatile vehicle is employed. A suitable coating composition of this character may be formed by mixing together 100 parts of rubber, 60 parts of sulphur, 1 part of accelerator, 10 parts of zinc oxide, 100 parts of pigment (whiting, clays or other coloring matters) by weight, and a volatile vehicle. A volatile vehicle in which rubber is somewhat soluble, such as gasoline, is preferably used in sufficient quantity to reduce the viscosity of the composition so that it may be applied in layers of film-like thickness from a spray gun, by a brush, or by dipping the article into the composition.

The coating composition is preferably applied upon the metal surface by spraying it in a highly atomized state and it is dried either during its application or thereafter so as to remove the main portion of the vehicle, thereby leaving a comparatively tacky film-like layer having vulcanizable ingredients of hard rubber in proper proportions. The metal surface is preferably heated to and maintained at a temperature between room temperature and the vulcanizing temperature of the composition during application of the latter. When this procedure is followed the main portion of the volatile vehicle is removed as the coating composition is applied and the vehicle of the innermost portions of the deposit which are adjacent the metal surface is driven off before the viscosity of the outermost portions of the deposit is increased sufficiently to prevent flowing of the outermost portions of the deposit and closing of the passages formed therein by the escapement of the volatilized vehicle from the inner portions of the deposit. The time required to effect the removal of the volatile vehicle in this manner depends upon the nature of the vehicle and the temperature at which the metal surface is heated. The metal surface is preferably heated to a temperature below that at which the ingredients of the composition vulcanize in order to prevent the formation of a rough deposit. We have found that when gasoline is used as a vehicle the most satisfactory results are obtained by heating the metal surface to substantially 180° F.

The drying operation may be conducted at room temperature, after the composition is applied, by continuing the drying over a comparatively long period of time. The deposit may be dried and reduced to a somewhat tacky state by heating it to substantially 180° F. in an oven. The temperature to which the deposit is subjected at this stage can be as high as 200° F., but in all events it should not exceed 240° F., which is the vulcanizing temperature of the hard rubber ingredients.

Heat may be applied during the drying operation by placing the article in an oven, or by electrical resistance or inductive heating. Hollow articles may be heated internally by introducing a heating medium into their interior. The articles may be heated to the desired temperature immediately before the coating composition is deposited thereon or the heating and application of the coating composition may be carried on at the same time.

After the drying operation the layer of unvulcanized ingredients is placed in a suitable oven and heated above the vulcanizing temperature long enough to cause the ingredients to become partially cured or vulcanized. This pre-curing operation is preferably conducted by heating the above composition to substantially 250° F. for approximately 10 minutes. The length of the period of heating depends upon the temperature employed and the character of the composition. The desired degree of vulcanization can be produced by curing at from 240° F. to 270° F. for from 5 to 30 minutes. Pre-vulcanizing of the deposit provides an undercoating which is capable of holding a second layer of the composition of substantial thickness against running and sagging and it also conditions the first layer to withstand being dissolved or excessively penetrated by the vehicle of the next layer. Vulcanization of the first layer is preferably discontinued before more than ten percent of the vulcanizing agent, such as sulphur in the above composition, chemically combines with the rubber so as to permit the first and second layers of the composition to integrally unite or fuse together.

Heat may be applied internally of the article during the pre-curing treatment by placing the article in an alternating magnetic field, or it may be heated by electrical resistance in an electric circuit. If the article is hollow this may be accomplished by introducing a heating medium into its interior. The pre-curing operating can also be successfully conducted in a suitable oven.

The first deposit or layer and the article to which it is applied are allowed to cool to a temperature within the above drying range, preferably 180° F., before the second layer is applied. The second layer is dried in either of the above ways set forth and it is pre-vulcanized to substantially the same extent as the first layer by heating it to a temperature between 240° F. and 270° F. for from 5 to 30 minutes. At a temperature of 250° F. sufficient vulcanization is effected in substantially 10 minutes. Any number of successive layers of the composition may be built up in the above manner to produce a coating of a desired thickness.

All of the above layers of the composition are then heated at a temperature of from 290° F. to 330° F. for from 1 to 4 hours to cause the ingredients to vulcanize to a hard rubber state. With the above composition substantially complete vulcanization may be effected by heating at a temperature of 315° F. for substantially two hours. This final treatment integrally bonds the successive layers together and to the metal surface, thereby providing a rigidly attached coating of hard rubber having a uniform thickness which is substantially homogeneous throughout. The coating may be subjected to the final vulcanizing treatment immediately after it is applied and dried. When only one layer of the composition is applied to the metal surface the pre-vulcanizing step may be omitted.

The final heat curing treatment may be conducted by placing the coated article in an oven or by inductively heating it internally by placing it in a magnetic field such as that created by passing an alternating current through an induction coil. If the coated article is hollow it may be heated internally by introducing a heating medium into its interior. In some cases the coated article can be heated internally by electric resistance by placing it in an electric circuit. Both internal and external heating of the article may be employed at the same time or at different stages of the final curing treatment. When internal heating is employed progressive curing outwardly from the innermost layers of the coating is assured.

Although but several specific embodiments of our invention are shown, it is understood that various changes in the materials employed and in the sequence of steps, as well as in the temperatures and periods of heating, may be made without departing from the spirit of our invention, and it is not our intention to limit its scope other than by the terms of the appended claims.

What we claim is:

1. The method of forming a hard rubber coating on a metal surface and integrally bonding said coating thereto which consists in applying on said surface successive film-like layers of liquid, vulcanizable hard rubber coating composition including rubber, a vulcanizing agent and a vulcanization accelerating agent and having a volatile vehicle; chemically reacting a portion materially less than all of the vulcanizing agent of the first layer with the rubber thereof while in contact with said metal surface and in the presence of said accelerating agent; chemically reacting materially less than all of the vulcanizing agent of each subsequent layer with the vulcanizing agent thereof in the presence of said accelerating agent; and simultaneously chemically reacting the remaining vulcanizing agent of said layers with the rubber thereof by heating said layers at a temperature within the vulcanizing range of said composition until the latter is converted to a true hard rubber state while in contact with said metal surface.

2. The method of forming a hard rubber coating on a surface which consists in applying on said surface successive film-like layers of liquid, vulcanizable hard rubber coating composition including rubber, a vulcanizing agent and a vulcanization accelerating agent and having a volatile vehicle; chemically reacting a portion materially less than all of the vulcanizing agent of each layer with the rubber thereof by heating each layer at a temperature within the vulcanizing range of said composition in the presence of said accelerator; and simultaneously chemically reacting the remaining vulcanizing agent of said layers with the rubber thereof by heating said layers at a temperature within the vulcanizing range of said composition until the latter is converted to a true hard rubber state.

3. The method of forming a hard rubber coating on a surface which comprises in applying on said surface a film-like layer of liquid, vulcanizable hard rubber coating composition including rubber, a vulcanizing agent and a vulcanization accelerating agent and having a volatile vehicle; simultaneously driving off some of said vehicle and chemically reacting a portion materially less than all of said vulcanizing agent with said rubber in the presence of said accelerating agent; applying a second film-like layer of said hard rubber coating composition and said first mentioned layer, simultaneously driving off some of the vehicle of said second layer and chemically reacting a portion materially less than all of the vulcanizing agent thereof with the rubber of said second layer in the presence of its accelerating agent; and simultaneously chemically reacting the remaining vulcanizing agent of both of said layers with the rubber thereof in the presence of said accelerating agent until said composition is converted to a true hard rubber state.

4. The method of forming a hard rubber coating on a metal surface and integrally bonding said coating thereto which consists in applying on said surface a film-like layer of liquid, vulcanizable hard rubber coating composition including rubber, a vulcanizing agent and a vulcanization accelerating agent and having a volatile vehicle; and chemically reacting said vulcanizing agent with said rubber in the presence of said accelerating agent by heating said composition to a temperature within the curing range thereof while in contact with said metal surface to cause said composition to vulcanize to a hard rubber state and to become integrally bonded to said surface.

WILLET J. McCORTNEY.
EDGAR L. BAILEY.